July 31, 1962   E. C. THACKER   3,047,161
FUNNEL-TYPE CAB AND STACK GUARD
Filed June 1, 1960   2 Sheets-Sheet 1
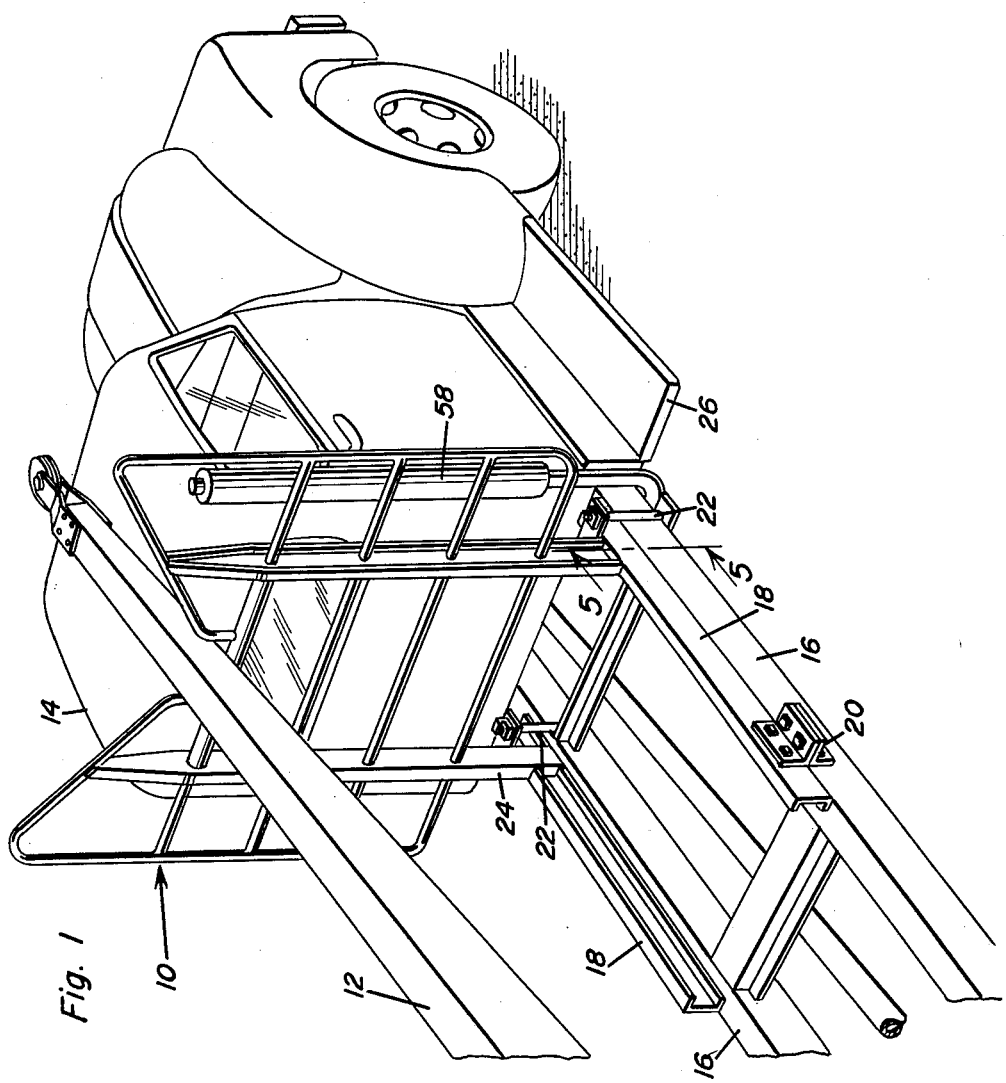
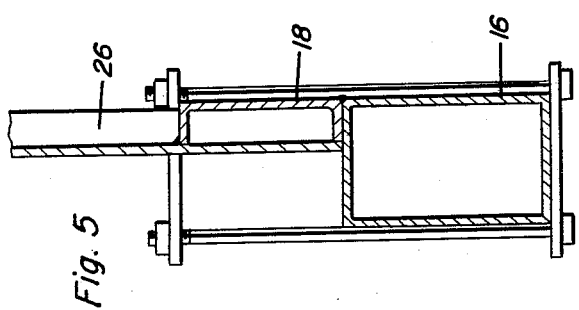
Ellis C. Thacker
INVENTOR.

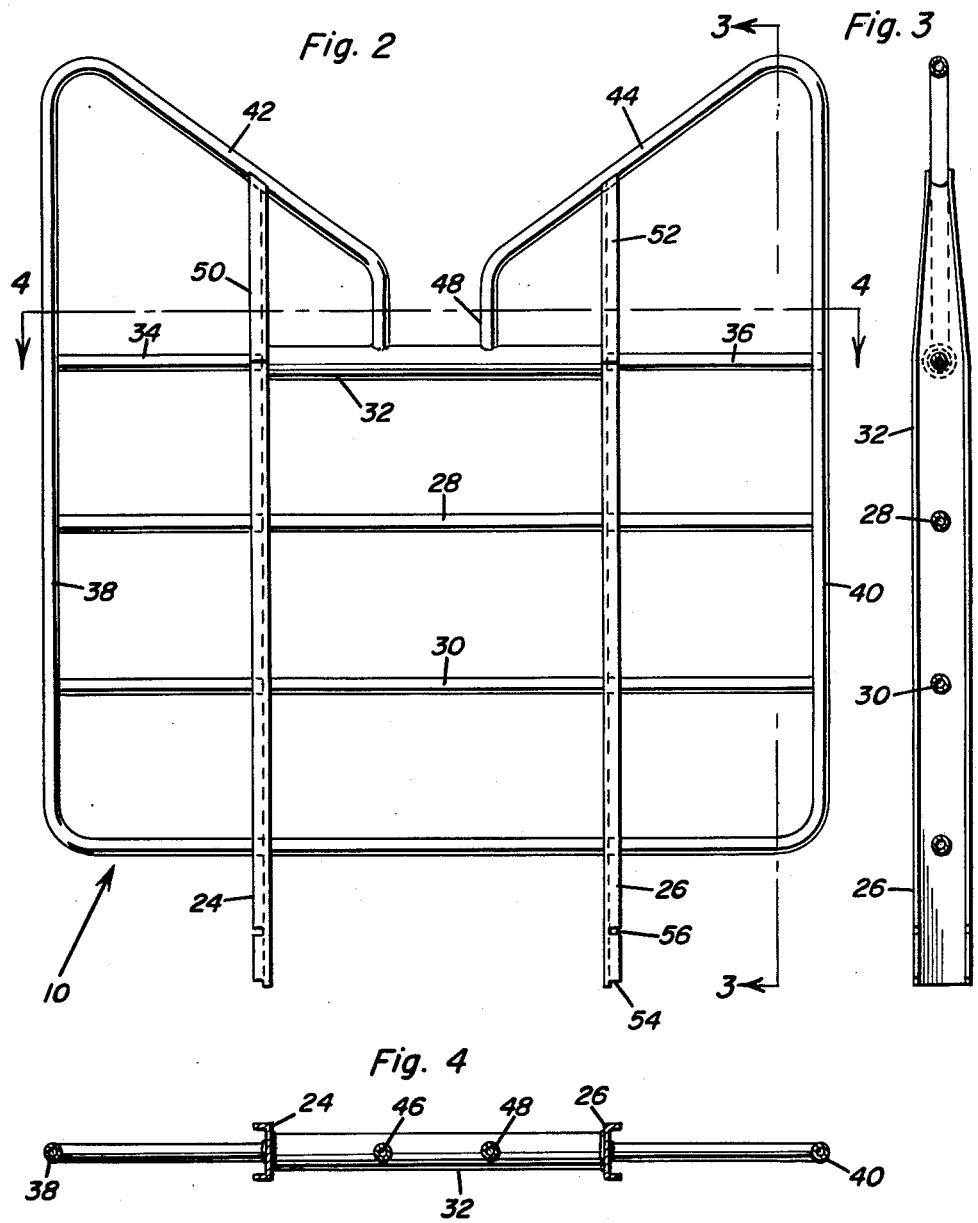

United States Patent Office 3,047,161
Patented July 31, 1962

3,047,161
FUNNEL-TYPE CAB AND STACK GUARD
Ellis C. Thacker, 1647 Chester Ave., Arcata, Calif.
Filed June 1, 1960, Ser. No. 33,173
4 Claims. (Cl. 212—59)

This invention relates to a guard construction, which is mounted on a vehicle body frame adjacent to the rear side of the vehicle cab for protecting the cab and any adjacent vehicle equipment such as diesel exhaust stack, from damage by a boom carried by the vehicle as it is being lowered into a retracted position on the guard.

It is therefore a primary object of this invention to provide a cab guard for a boom carrying vehicle, for protecting the cab and other adjacent vehicle equipment from damage by the boom when being lowered into a retracted position and for providing a rack for the boom when retracted.

It is a further object of this invention in accordance with the foregoing object, to provide a cab guard which has means for guiding a boom being lowered into retracted position, without the driver of the vehicle being called upon to manually guide the boom toward its rest position on the guard.

Another object of this invention in accordance with the foregoing object, is to provide a guard which is of sturdy but simple construction and useful on many different size vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the guard in accordance with this invention, installed on a vehicle.

FIGURE 2 is a front plan view of the guard itself.

FIGURE 3 is a sectional view taken through a plane indicated by section line 3—3 in FIGURE 2.

FIGURE 4 is a sectional view of the guard taken through a plane indicated by section line 4—4 in FIGURE 2.

FIGURE 5 is a sectional view taken through a plane indicated by section line 5—5 in FIGURE 1 showing the mounting of the channel support member on the vehicle frame.

Referring to FIGURE 1, the guard generally indicated by reference numeral 10 is shown mounted on a vehicle having or carrying a boom 12 shown resting on the guard, the guard 10 being positioned on the vehicle to the rear of its cab 14 and mounted on the vehicle frame 16.

The guard 10 is mounted on the vehicle frame 16 by means of footing channel members 18 secured to the frame 16 at their rear ends by angle plates 20 and at their forward ends by U-bolts 22. The guard 10 includes a pair of parallel upright channel members 24 and 26 which are secured to the footing channel members 18 by being lapped thereto as more clearly seen in FIGURE 5.

In FIGURES 2, 3 and 4, the guard construction itself is shown. Horizontal tubular members 28 and 30 are secured to the two upright channel members 24 and 26 and extend laterally there-beyond of sufficient distance so as to accommodate any size cab this guard is meant to protect. Also disposed between the upright channel members 24 and 26 is a horizontal tubular bar 32 being of greater diameter and strength than the other tubular elements so as to provide adequate support for the boom 12 that may be resting thereon. Horizontal tubular members 34 and 36 in line with bar 32 are also secured to the upright members 24 and 26 and extend laterally therefrom. Tubular members 38 and 40 interconnect all the laterally extending tubular members and are secured to the vertical upright members 24 and 26 near the bottom thereof and extend upwardly well above the height of any size cab to which this guard is applied and form inclined portions 42 and 44 terminating at ends 46 and 48 which are secured to the horizontal rest bar 32 also located above the height of any size cab to which this guard may be applied.

The vertical channel members 24 and 26 are tapered at their upper ends 50 and 52 at which ends they are secured as by welding to the guide portions 42 and 44, said guide portions 42 and 44 together with their ends 46 and 48 constituting a cross-section of a funnel. The bottom of the channel members 24 and 26 are notched as indicated at 54 and 56 so that said channel members 24 and 26 may be lapped to the corresponding notches on the footing channels 18.

It is therefore apparent, that as the boom 12 is lowered to its rest position, it will engage either guide portion 42 or 44 due to lateral swinging of the boom 12 and thereby be guided into the space between the guide ends 46 and 48 for final resting upon the horizontal rest bar 32. The lateral portions of the guard will accordingly protect the sides of the cab and any equipment mounted adjacent thereto such as stack 58. The rest bar 32 being positioned above the height of the cab top will accordingly protect said cab top from the boom. It is also apparent therefore that no assistance from the driver will be necessary in order to guide the boom into its rest position on bar 32. This particular guard construction therefore, has a wider protective range and is additionally useful as a labor saving device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a vehicle having a frame, a cab and a swingable boom, and a readily attachable and detachable boom rest and cab guard comprising a vertically disposed framework mounted on the frame of said vehicle rearwardly of the cab, said framework being wider than the cab and including a pair of side members, a cross member extending between said side members in a plane spaced above the top of the cab, said side members extending upwardly beyond said cross member, a pair of downwardly convergent boom guiding rails extending inwardly from the upper ends of said side members and connected at their lower ends to said cross member at points spaced longitudinally of the latter, a portion of the cross member between the lower ends of said guiding rails constituting a rest for said boom, a pair of spaced uprights disposed inwardly from said side members, the upper ends of said uprights being secured to intermediate portions of said guiding rails, and a pair of horizontal base members disposed in transversely spaced relation and having the lower ends of said uprights secured thereto, said base members being secured to the frame of said vehicle.

2. The device as defined in claim 1 wherein said guiding rails are provided with straight vertical lower end portions secured to said cross member.

3. A readily attachable and detachable boom rest and cab guard for vehicles, comprising a vertically disposed framework including a pair of side members, a cross member extending between intermediate portions of said side members, said side members extending upwardly beyond said cross member, a pair of downwardly convergent boom guiding rails extending inwardly from the upper ends of the side members and connected at their lower ends to said cross member at points spaced longitudinally of the latter, a portion of the cross member between the lower ends of said guiding rails constituting a boom rest, a pair of spaced uprights disposed inwardly from said side members, the upper ends of said uprights being secured to intermediate portions of said guiding rails, and a pair of transversely spaced horizontal base members having the lower ends of said uprights secured thereto, said base members being adapted to be secured to a vehicle frame.

4. The device as defined in claim 3 wherein said guiding rails are provided with straight vertical lower end portions secured to said cross member.

References Cited in the file of this patent

UNITED STATES PATENTS

| | | |
|---|---|---|
| 2,157,376 | Zeilman | May 9, 1939 |
| 2,233,697 | Freitag | Mar. 4, 1941 |
| 2,590,388 | Dornath | Mar. 25, 1952 |
| 2,711,803 | Hurst | June 28, 1955 |